(12) United States Patent
Nakamura et al.

(10) Patent No.: US 6,753,908 B1
(45) Date of Patent: Jun. 22, 2004

(54) LINEAR MATRIX CIRCUIT

(75) Inventors: Hitoshi Nakamura, Kanagawa (JP); Keiichi Ito, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/360,391

(22) Filed: Jul. 23, 1999

(30) Foreign Application Priority Data

Jul. 27, 1998 (JP) .......................................... P10-210164

(51) Int. Cl.$^7$ ................................................. H04N 9/73
(52) U.S. Cl. .................... 348/223.1; 348/646; 358/518; 358/520
(58) Field of Search .............................. 358/518, 520; 348/646, 223.1

(56) References Cited

U.S. PATENT DOCUMENTS 4,661,841 A * 4/1987 Suzuki ....................... 348/646
5,563,666 A * 10/1996 Suzuki ....................... 348/645

* cited by examiner

*Primary Examiner*—Andrew Christensen
*Assistant Examiner*—Dorothy Wu
(74) *Attorney, Agent, or Firm*—Frommer Lawrence & Haug LLP; William S. Frommer; Gordon Kessler

(57) ABSTRACT

The invention provides a linear matrix circuit which can control linear conversion of color reproduction with a comparatively small number of parameters, which conform with a feeling of a human being, by means of a circuit of a comparatively small scale using a comparatively simple method. The linear matrix circuit performs linear conversion of color reproduction for use with an image processing apparatus which separates a video signal into three primary color components of red, green and blue, and includes a coefficient conversion section for introducing six coefficients required for the linear conversion of color reproduction from two control parameters.

1 Claim, 3 Drawing Sheets

LINEAR MATRIX CIRCUIT

BACKGROUND OF THE INVENTION

This invention relates to a linear matrix circuit, and more particularly to a linear matrix circuit having a conversion function by which matrix coefficients can be represented using a comparatively small number of parameters.

A television camera employs a circuit called linear matrix for filling up differences between chromaticity points of primary colors (RGB) prescribed in accordance with standards and chromaticity points of an actual camera. The circuit can be used to vary the color repeatability.

The circuit performs, for example, for a R signal, processing of multiplying difference components between the R signal and a G signal and difference components between the R signal and a B signal by coefficients and adding resulting sums and performs similar processing also for the G signal and the B signal. Where color signals before they pass the circuit are represented by R, G and B and the color signals after they pass the circuit are represented by R', G' and B', the color signals R', G' and B' can be represented by the following expressions:

$$R'=R+\alpha(R-G)+\beta(R-B) \tag{1a}$$

$$G'=G+\gamma(G-R)+\delta(G-B) \tag{1b}$$

$$B'=B+\epsilon(B-R)+\zeta(B-G) \tag{1c}$$

where $\alpha$, $\beta$, $\gamma$, $\delta$, $\epsilon$ and $\zeta$ are matrix coefficients.

Conventionally, if the circuit described above is used in order to obtain a color repeatability desired by its user, since it involves up to six matrix coefficients, it is very cumbersome to control the circuit. Further, the individual coefficients are mere coefficients on numerical expressions, and what are meant by them cannot be recognized personally. For example, it is difficult to imagine in what manner a color varies when the coefficient $\alpha$ is controlled.

The matrix circuit may employ another configuration wherein a color plane is divided into several portions and matrix coefficients are provided for the individual portions of the color plane. In particular, the configuration allows use of different matrix coefficients for the colors of red and blue.

As an example, eight axes which pass the origin are prepared on a color plane, and independent coefficients are provided individually on the axes. And, a color between two difference axes has a coefficient obtained by weighted meaning the colors of the axes in accordance with angles between the color and the axes. In this instance, since a coefficient does not exhibit a sudden variation depending upon the color, no unnatural color is exhibited.

However, with the circuit of the configuration just described, for example, where a color plane is divided into eight portions, up to 8×6=48 coefficients must be controlled while they cannot be recognized personally. Thus, it is almost impossible to control the circuit in a manner desired by a human being.

On the other hand, in order to control the color of a video signal, a method is employed frequently wherein the video signal is represented by a brightness signal Y and two color difference signals R-Y and B-Y and the chromaticity is calculated by processing of the two color difference signals. With the method just described, however, where it is applied to an apparatus such as a television camera which handles primary colors, it is necessary to convert the primary color signals into color difference signals and then convert the color difference signals back into primary color signals. This gives rise to deterioration of the signals and enlargement of the circuit scale.

As described above, since the conventional linear matrix circuit for color conversion has a large number of matrix coefficients, it has a problem in that control thereof does not conform to a feeling of a human being and is cumbersome. Further, where a video signal is represented by and processed in the form of a bright signal and two color difference signals, conversion between the signals must be repeated. Consequently, the conventional linear matrix circuit has a problem in that repetition of such conversion gives rise to deterioration of signals and enlargement of the circuit scale.

SUMMARY OF THE INVENTION

It is an object of the present invention to provide a linear matrix circuit which can control linear conversion of color reproduction with a comparatively small number of parameters, which conform with a feeling of a human being, by means of a circuit of a comparatively small scale or software of a small scale using a comparatively simple method.

In order to attain the object described above, according to the first aspect of the present invention, there is provided a linear matrix circuit for linear conversion of color reproduction for use with an image processing apparatus which separates a video signal into three primary color components of red, green and blue and performs processing on each of the components, comprising coefficient conversion means for introducing six coefficients required for the linear conversion of color reproduction from two control parameters.

According to the second aspect of the present invention, with the linear matrix circuit, linear conversion of color reproduction can be controlled with two parameters by means of a circuit of a comparatively small scale or software of a small scale using a comparatively simple method.

The two control parameters may correspond to a saturation and a hue. With the linear matrix circuit, linear conversion of color reproduction can be controlled with the two parameters, which conform with a feeling of a human being, by means of a circuit of a comparatively small scale or software of a small scale using a comparatively simple method.

According to the third aspect of the present invention, where the three primary color components before the linear conversion are represented by R, G and B and the three primary color components after the linear conversion are represented by R', G' and B', matrix coefficients $\alpha$, $\beta$, $\gamma$, $\delta$, $\epsilon$ and $\zeta$ before the linear conversion represented by $$R'=R+\alpha(R-G)+\beta(R-B)$$

$$G'=G+\gamma(G-R)+\delta(G-B)$$

$$B'=B+\epsilon(B-R)+\zeta(B-G)$$

may be represented with a control parameter a for controlling the chromaticity and another control parameter b for controlling the hue by $$\alpha=-0.59a-0.59b$$

$$\beta=-0.11a+0.89b$$

$$\gamma=-0.3a+0.2831b$$

$$\delta=-0.11a-0.4731b$$

$$\epsilon=-0.3a-0.7b$$

$$\zeta=-0.59a+0.59b$$

With the linear matrix circuit, the coefficient conversion means can be implemented readily from a simple circuit or a simple program.

The above and other objects, features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENT

Figure 2:
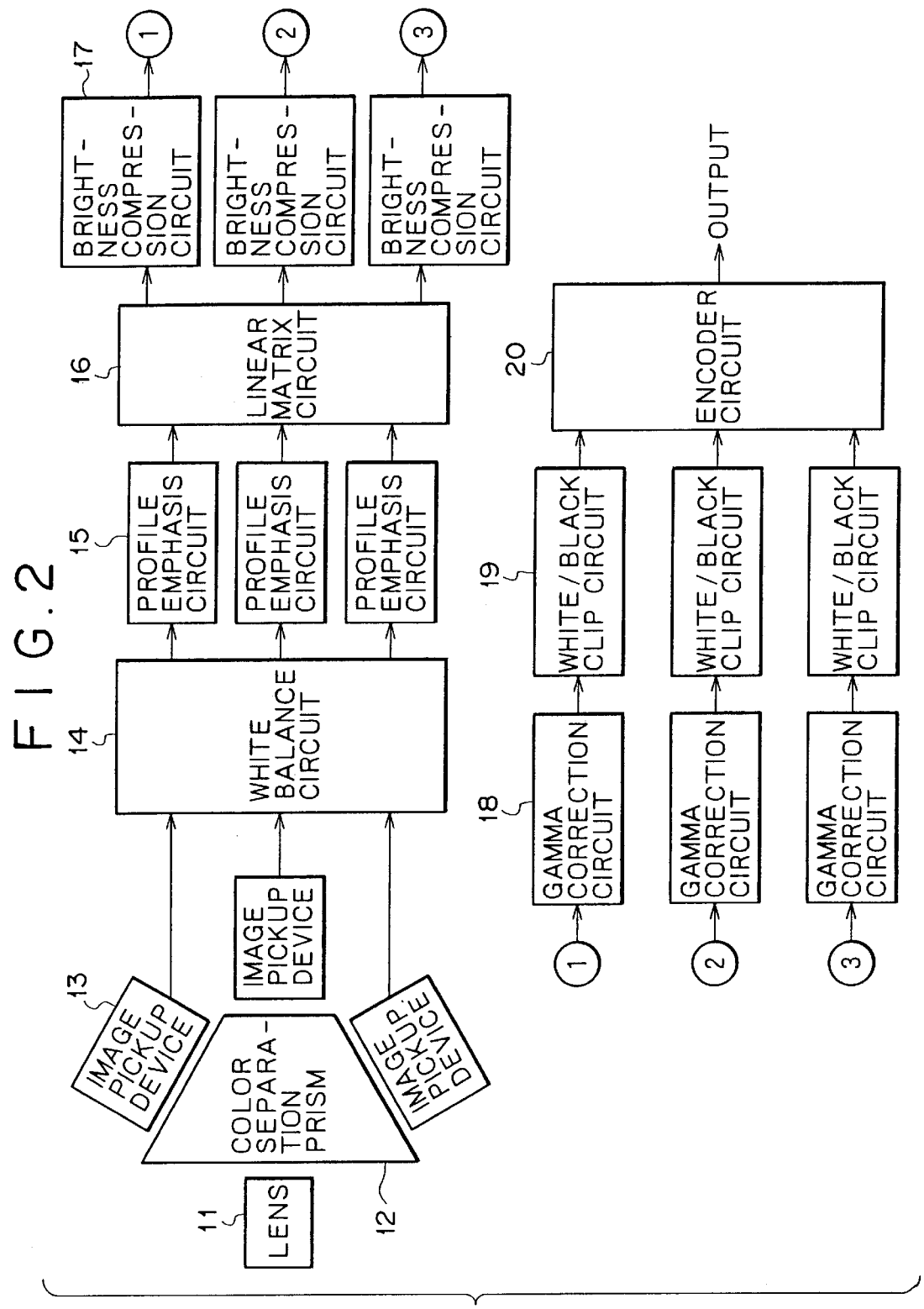
FIG. 2 is a block diagram of an image pickup camera in which the linear matrix circuit of FIG. 1 is incorporated.

Referring first to FIG. 2, there is shown an image pickup camera in which a linear matrix circuit according to the present invention is incorporated. The image pickup camera shown includes a lens 11, a color separation prism 12, three image pickup devices 13, a white balance circuit 14, three profile emphasis circuits 15, a linear matrix circuit 16, three brightness compression circuits 17, three gamma correction circuits 18, three white/black clip circuits 19, and an encoder circuit 20.

A picked up image of an imaging object passes through the lens 11 and separated into light components of three colors of R, G and B by the color separation prism 12. Then, the light components of the three colors form images on the respective image pickup devices 13. The image pickup devices 13 convert the light components individually into electric signals. The converted electric signals successively subject to white balance processing by the white balance circuit 14, profile emphasis processing by the profile emphasis circuits 15, linear matrix processing by the linear matrix circuit 16, brightness compression processing by the brightness compression circuits 17, gamma correction processing by the gamma correction circuits 18, and white/black clip processing by the white/black clip circuits 19, and is then outputted as a video signal from the encoder circuit 20.

Figure 3:
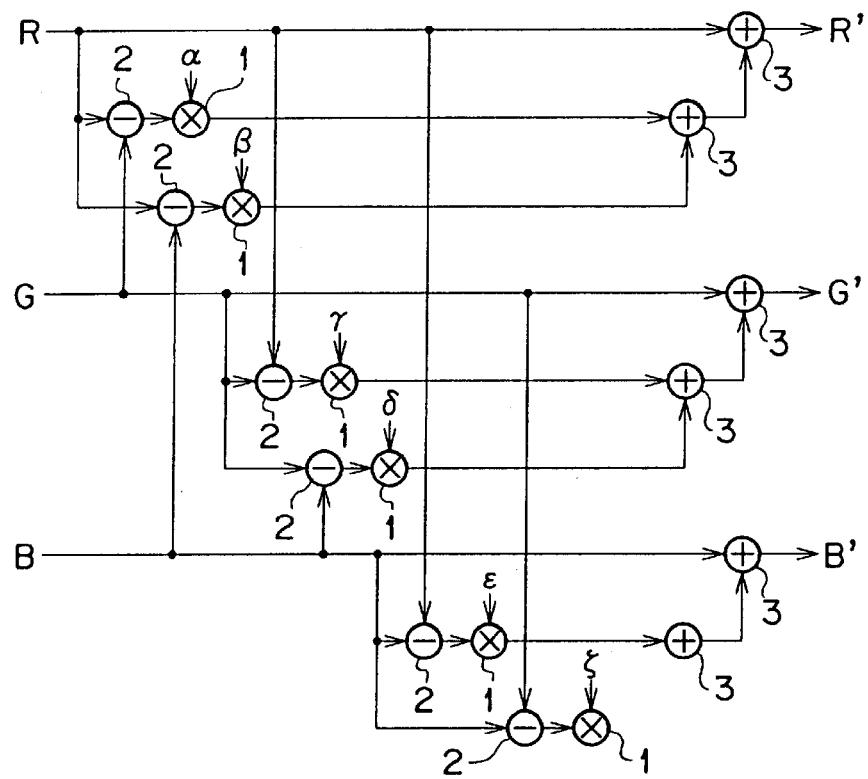
FIG. 3 is a circuit diagram of a conventional linear matrix circuit.

FIG. 3 shows an example of a construction of a conventional linear matrix circuit. Referring to FIG. 3, the conventional linear matrix circuit 16 shown includes six coefficient multiplication circuits 1, six subtraction circuits 2 and six addition circuits 3 for three color signals of R, G and B. For example, for the R signal, the linear matrix circuit performs processing given by the expression (1a) above by which a difference component between the R signal and the G signal and a difference component between the R signal and the B signal are multiplied by respective predetermined coefficients and resulting products are added, and for the G signal and the B signal, the linear matrix circuit performs similarly processing given by the expressions (1b) and (1c) given above, respectively, to obtain a R' signal, a G' signal and a B' signal to be outputted from the linear matrix circuit. The linear matrix circuit requires six coefficients as can be shown from FIG. 3 and the expressions (1a) to (1c).

Figure 4:
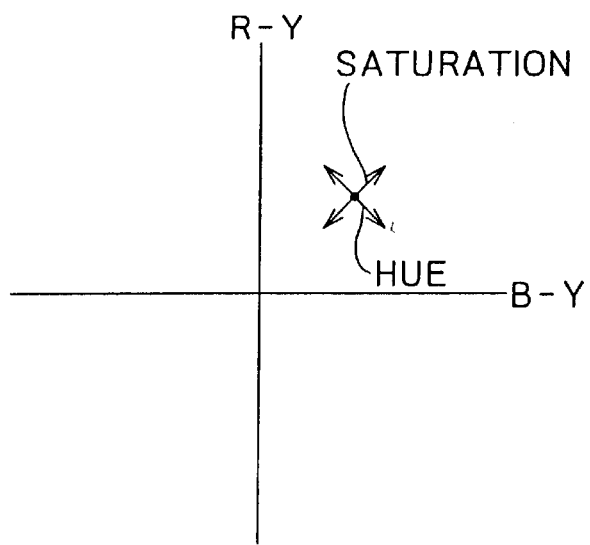
FIG. 4 is a diagram illustrating two parameters on a B-Y, R-Y plane.

By the way, a color can be represented by three characteristics of brightness (luminance), hue (phase) and saturation. Further, since the chromaticity can be represented by a plane, in order to vary a certain chromaticity to another chromaticity, only movement parameters of two directions are required. An example of two parameters of a B-Y, R-Y plane is shown in FIG. 4. As shown in FIG. 4, only two parameters in two directions of the hue and the saturation are required.

While the matrix circuit of FIG. 3 and the expressions (1a) to (1c) involve six coefficients, if they can be controlled with two parameters, they can be adjusted manually and can be recognized personally. This is still better where the two parameters are such popular ones as the hue and the chromaticity.

Figure 1:
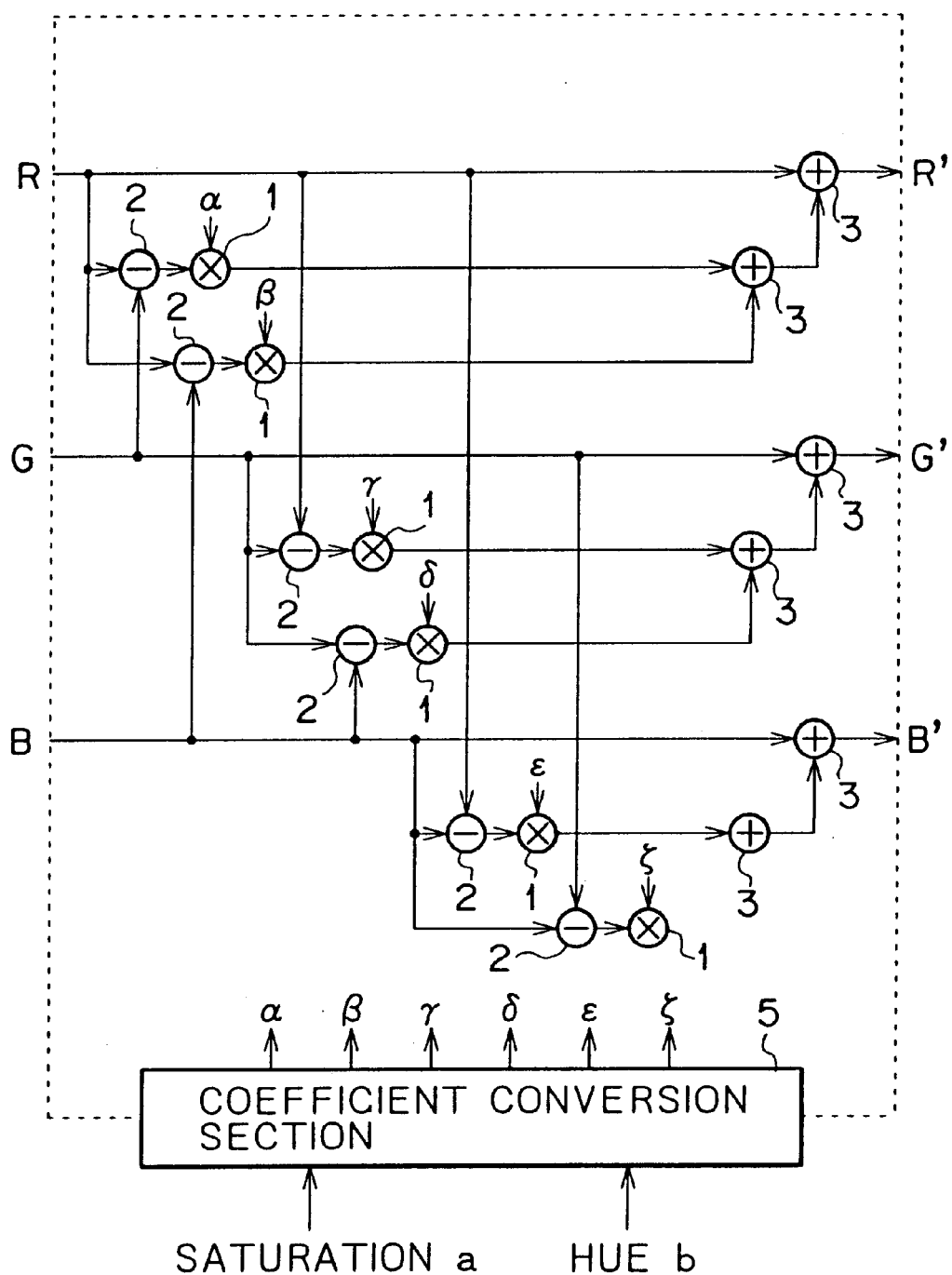
FIG. 1 is a circuit diagram of a linear matrix circuit to which the present invention is applied.

A linear matrix circuit to which the present invention is applied and which can be incorporated in the image pickup camera described hereinabove with reference to FIG. 2 is shown in FIG. 1. Referring to FIG. 1, the linear matrix circuit shown is an improvement to and different from the conventional linear matrix circuit described hereinabove with reference to FIG. 3 in that it additionally includes a coefficient conversion section 5. The coefficient conversion section 5 may be composed of a circuit or software which converts two manual control parameters, that is, a hue and a saturation, into six parameters.

Operation of the coefficient conversion section 5 is described by way of an example.

1) Method of Controlling the Saturation

The expressions when the brightness and the hue do not exhibit a variation are given by $$R'=(1-a)R+aY \quad (2a)$$

$$G'=(1-a)G+aY \quad (2b)$$

$$B'=(1-a)B+aY \quad (2c)$$

By expanding the expressions (2a) to (2c) using $$Y=0.3R+0.59G+0.11B$$

the following expressions (3), (4) and (5) are obtained, respectively:

$$R'=(1-0.7a)R+0.59aG+0.11aB \quad (3)$$

$$G'=0.3aR+(1-0.41a)G+0.11aB \quad (4)$$

$$B'=0.3aR+0.59aG+(1-0.89a)B \quad (5)$$

Meanwhile, by expanding the expressions (1a) to (1c):

$$R'=R+\alpha(R-G)+\beta(R-B) \quad (1a)$$

$$G'=G+\gamma(G-R)+\delta(G-B) \quad (1b)$$

$$B'=B+\epsilon(B-R)+\zeta(B-G) \quad (1c)$$

the following expressions (6), (7) and (8) are obtained, respectively:

$$R'=(1+\alpha+\beta)R-\alpha G-\beta B \quad (6)$$

$$G'=-\gamma R+(1+\gamma+\delta)G-\delta B \quad (7)$$

$$B'=-\epsilon R-\zeta G+(1+\epsilon+\zeta)B \quad (8)$$

Comparing the expressions (3), (4) and (5) and the expressions (6), (7) and (8) with each other, respectively, from the expressions (3) and (6), $$\alpha=-0.59a$$

$$\beta=-0.11a$$

are obtained; from the expressions (4) and (7), $$\gamma=-0.3a$$

$$\delta=-0.11a$$

are obtained; and from the expressions (5) and (8), $\epsilon = -0.3a$ $\zeta = -0.59a$ are obtained.

2) Method of Controlling the Hue

A hue is moved in a direction perpendicular to the axis of an object color. In this instance, a saturation is not maintained for simplified calculation.

Such a plane having an abscissa B-Y and an ordinate R-Y as shown in FIG. 4 is taken into consideration. If an object color is represented by (B-Y, R-Y), a color obtained by rotating the object color by 90° is (–(R-Y), B-Y). Therefore, when a hue is moved, the following expressions stand:

$$R'-Y = (R-Y) + b(B-Y) \quad (9a)$$

$$B'-Y = -b(R-Y) + (B-Y) \quad (9b)$$

Here, if Y'=Y, then $$R' = (1-0.3b)R - 0.59bG + 0.89bB \quad (10)$$

$$B' = -0.7bR + 0.59bG + (1+0.11b)B \quad (11)$$

are obtained.

From the expressions (6) and (10), $\alpha = 0.59b$ $\beta = -0.89b$ are obtained, and from the expressions (8) and (11), $\epsilon = 0.7b$ $\zeta = -0.59b$ are obtained.

Since Y=Y' as above, from the expressions (7), (10) and (11), $$\begin{aligned}
Y &= 0.3R + 0.59G + 0.11B \\
&= 0.3R' + 0.59G' + 0.11B' \\
&= 0.3 \times \{(1 - 0.3b)R - 0.59bG + 0.89bB\} + \\
&\quad 0.59 \times \{-\gamma R + (1 + \gamma + \delta)G - \delta B\} + \\
&\quad 0.11 \times \{-0.7bR + 0.59bG + (1 + 0.11b)B\} \\
&= (0.3 - 0.167b - 0.59\gamma)R + \\
&\quad (0.59 - 0.1121b + 0.59\gamma + 0.59\delta)G + \\
&\quad (0.11 + 0.2791b - 0.59\delta)B
\end{aligned}$$

is obtained.

Accordingly, $0.3 = 0.3 - 0.167b - 0.59\gamma$ $0.59 = 0.59 - 0.1121b + 0.59\gamma + 0.59\delta$ $0.11 = 0.11 + 0.2791b - 0.59\delta$ are satisfied.

From the expressions, $\gamma = -0.2831b$ $\delta = 0.4731b$ are obtained.

3) Conclusion

If an influence between a saturation and a hue is ignored for simplified investigation, then since $\alpha, \beta, \gamma, \delta, \epsilon$ and $\zeta$ are represented as sums of matrix coefficients for a case wherein only the saturation is controlled and matrix coefficients for another case wherein only the hue is controlled, the following matrix coefficients $\alpha, \beta, \gamma, \delta, \epsilon$ and $\zeta$ can be used to realize the present invention:

$$\alpha = -0.59a - 0.59b \quad (12a)$$

$$\beta = -0.11a + 0.89b \quad (12b)$$

$$\gamma = -0.3a + 0.2831b \quad (12c)$$

$$\delta = -0.11a - 0.4731b \quad (12d)$$

$$\epsilon = -0.3a - 0.7b \quad (12e)$$

$$\zeta = -0.59a + 0.59b \quad (12f)$$

In other words, the six matrix coefficients can be represented simply using the two control parameters a and b corresponding to the saturation and the hue. Therefore the coefficient conversion section 5 can be readily implemented with a simple circuit or a simple program.

Such processing exhibits its effectiveness particularly with a circuit which can have matrix coefficients individually for divisional portions obtained by dividing a color plane. As an example, where a color plane has eight axes which pass the origin, even where manual adjustment is used, 8×6=48 different parameters must be operated usually. However, where the method described above is used, only 2×6=12 parameters are required and it can be imagined readily in what manner the individual characters are observed with a measuring instrument.

It is to be noted that, while the present invention is described above in connection with a three-plate type color camera, it can be recognized by those skilled in the art that the present invention can be applied also to a single-plate type color camera by using signals obtained from filters for the three primary colors of red, green and blue.

While a preferred embodiment of the present invention has been described using specific terms, such description is for illustrative purposes only, and it is to be understood that changes and variations may be made without departing from the spirit or scope of the following claims.

What is claimed is:

1. A linear matrix circuit for linear conversion during color reproduction for use with an image processing apparatus which separates a video signal into three primary color components of red, green and blue and performs processing on each of the components comprising:

coefficient conversion means for deriving, from two control parameters, six coefficients required for the linear conversion during color reproduction, wherein the two control parameters correspond to a saturation and a hue; and wherein the three primary color components before the linear conversion are represented by R, G and B and the three primary color components after the linear conversion are represented by R', G' and B', and matrix coefficients $\alpha, \beta, \gamma, \delta, \epsilon$ and $\zeta$ are used in the linear conversion as follows:

$$R' = R + \alpha(R-G) + \beta(R-B)$$

$$G' = G + \gamma(G-R) + \delta(G-B)$$

$$B' = B + \epsilon(B-R) + \zeta(B-G)$$

and, are represented with a control parameter "a" for controlling the chromaticity and another control parameter "b" for controlling the hue as follows:

$\alpha = -0.59a - 0.59b$ $\beta = -0.11a + 0.89b$ $\gamma = -0.3a + 0.2831b$ $\delta = -0.11a - 0.4731b$ $\epsilon = -0.3a - 0.7b$ $\zeta = -0.59a + 0.59b.$

* * * * *